INVENTOR.
STEVEN J. DZIADULONIS

Nov. 20, 1962

S. J. DZIADULONIS 3,064,460

MACHINE FOR REDUCING AND ROUGHENING
THE MARGIN OF A SOLE

Filed Oct. 23, 1961

INVENTOR.
STEVEN J. DZIADULONIS
BY
ATTORNEY.

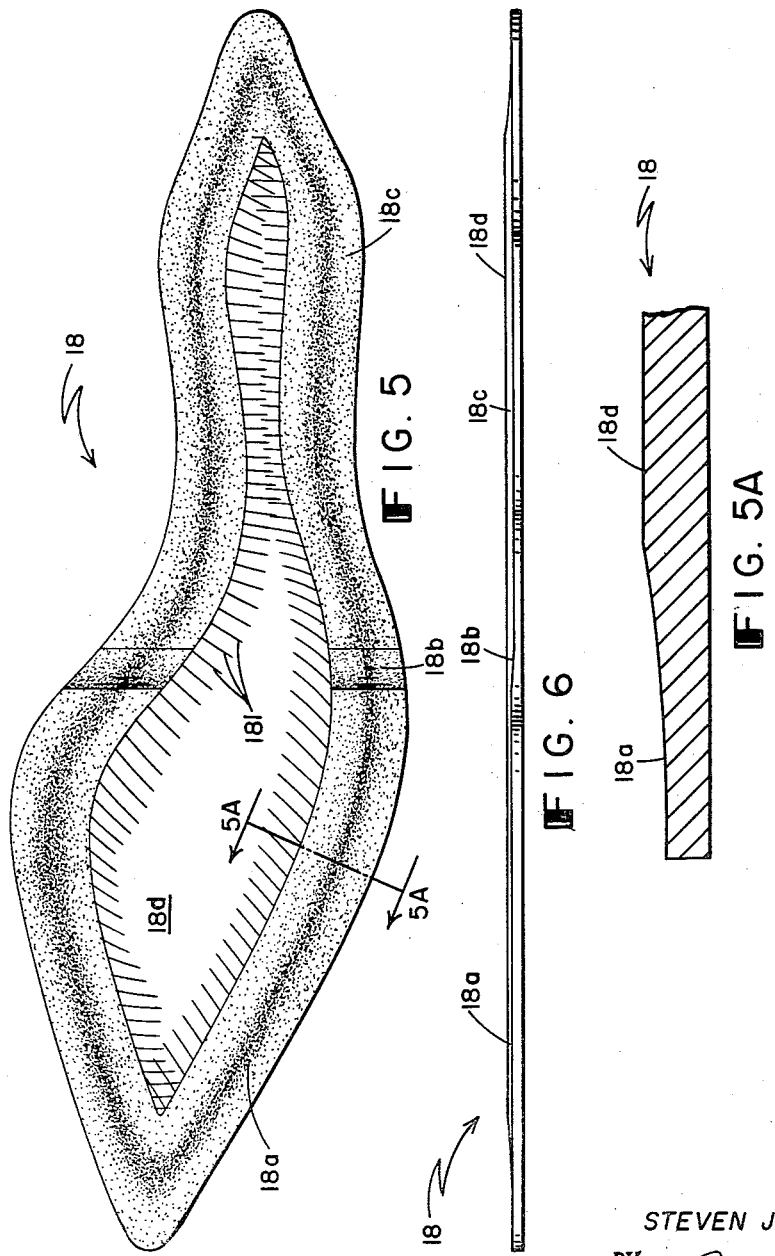

3,064,460
MACHINE FOR REDUCING AND ROUGHENING
THE MARGIN OF A SOLE
Steven J. Dziadulonis, 899 Western Ave., Lynn, Mass.
Filed Oct. 23, 1961, Ser. No. 146,824
11 Claims. (Cl. 69—6.5)

This invention relates to a method and machine for reducing and roughening the marginal portion of an outer sole prior to its attachment to a shoe. In particular, it relates to a machine which simultaneously provides marginal reduction and a superior uniformly roughened surface on a sole suitable for cementing to an upper.

Although methods and machines have been suggested in the past for the simultaneous operation of reducing and roughening sole margins, all have had one or more deficiencies. These deficiencies have included insufficient roughening which can lead to poor bonding, complicated and hence expensive mechanisms, and a high degree of skill.

One object of this invention is to provide a relatively simple machine for simultaneously reducing and roughening the marginal portions of an outer sole.

A further object of this invention is to provide outer soles with sufficient roughened marginal areas so as to improve the bonding of the sole to the upper.

A still further object of this invention is to provide such a machine whose operation requires little skill and lends itself to completely automatic operation.

The invention comprises generally a horizontal working surface having apertures through which protrude a circular saw and a rotatable worm feed. The circular saw is rotatable in a vertical plane and protrudes above the working surface a distance of the same order of magnitude as the marginal reduction desired. The worm feed has its exposed surface just slightly above the working surface adjacent to the one end of the exposed surface of the saw. A guide roller is positioned on the working surface on each side of the saw preferably close to the worm feed. The axes of rotation of the saw and worm feed are parallel, the direction of rotation of the saw being opposite to the direction of rotation of the worm feed. Spaced above the worm feed and saw and to one side of the guide rollers is positioned a sole positioning block which is preferably spaced about a sole thickness away from the working surface. The working surface, guide rollers and sole positioning block effectively form a notch or pocket which limits the motion of the inserted sole heightwise and on one side. The thrust of the worm feed and saw tends to simultaneously force the edge of the sole against the saw teeth and push it along its edge and out.

In operation the sole is slid or fed longitudinally to the worm which, in combination with the saw, takes hold and reduces and roughens the marginal portion of the side adjacent to the guide rollers. The operation is completed by re-feeding the sole longitudinally on its other edge. Once the worm feed has taken hold the operation is automatic and the sole is ejected. If completely automatic operation is desired, several obvious modifications can be made. Thus the soles can be moved along by conventional means until they are caught by the worm, picked up on the other side of the machine by other conventional means which can turn the sole around and then feed it to a second machine by its other edge.

In the reducing and roughening of the margin of a sole, it may be desirable according to the type of shoe to have either a uniform marginal reduction or a greater reduction in the shank than in the forepart. One feature of this invention is the provision of means for so changing the amount of marginal reduction during operation by instantaneous control of the amount of saw protrusion.

One embodiment of this invention is illustrated in the appended drawings wherein:

FIGURE 5 is a bottom view of a sole which has been marginally reduced on both sides by the illustrated machine.

FIGURE 5A is a partial section along line 5A—5A of FIGURE 5.

FIGURE 6 is a side view of FIGURE 5.

Figure 1:
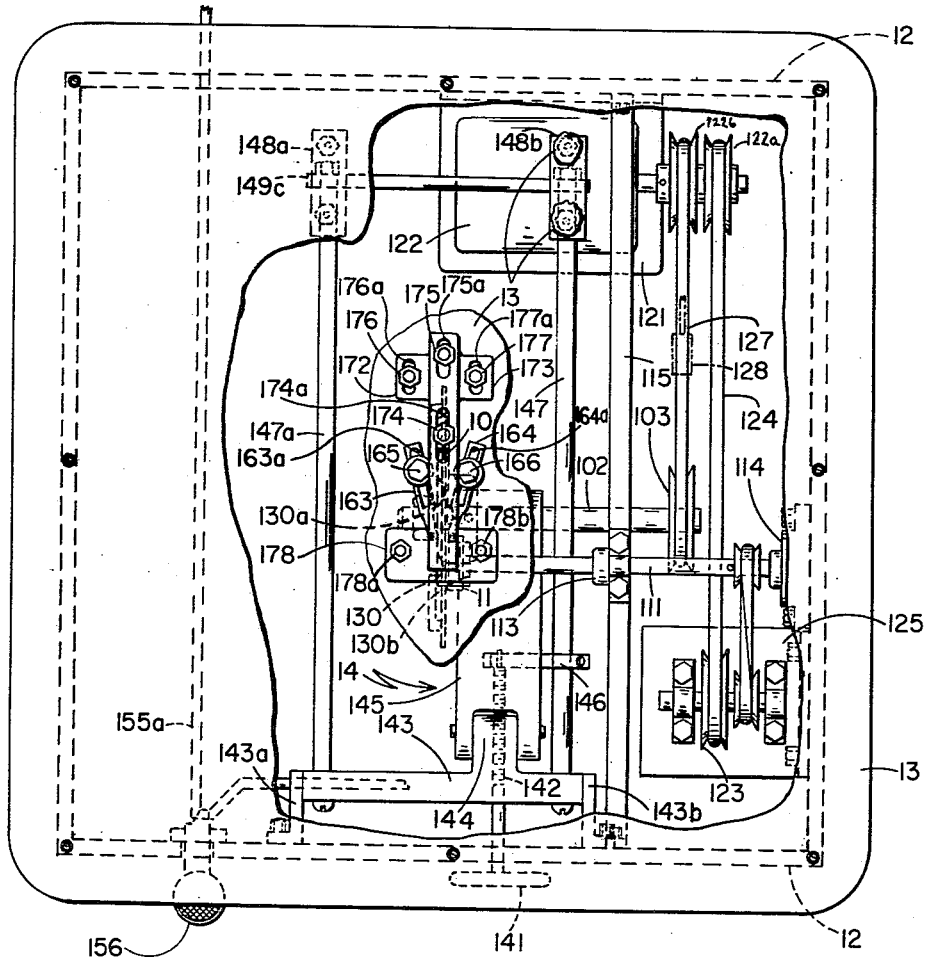
FIGURE 1 is a plan view of the device with partial cutaway.
Figure 2:
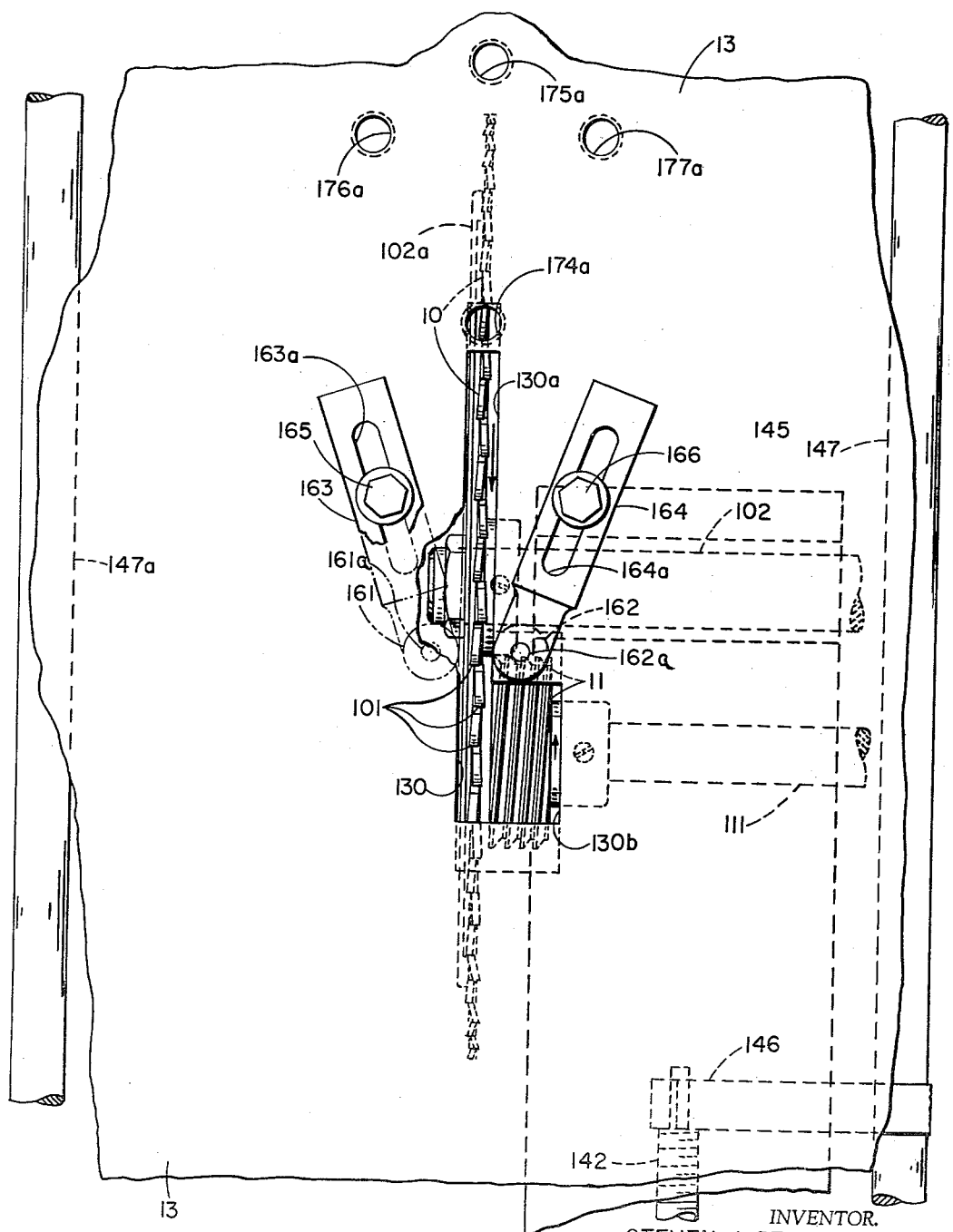
FIGURE 2 is an enlarged plan view of the central portion with the head removed so as to expose the saw and worm.
Figure 3:
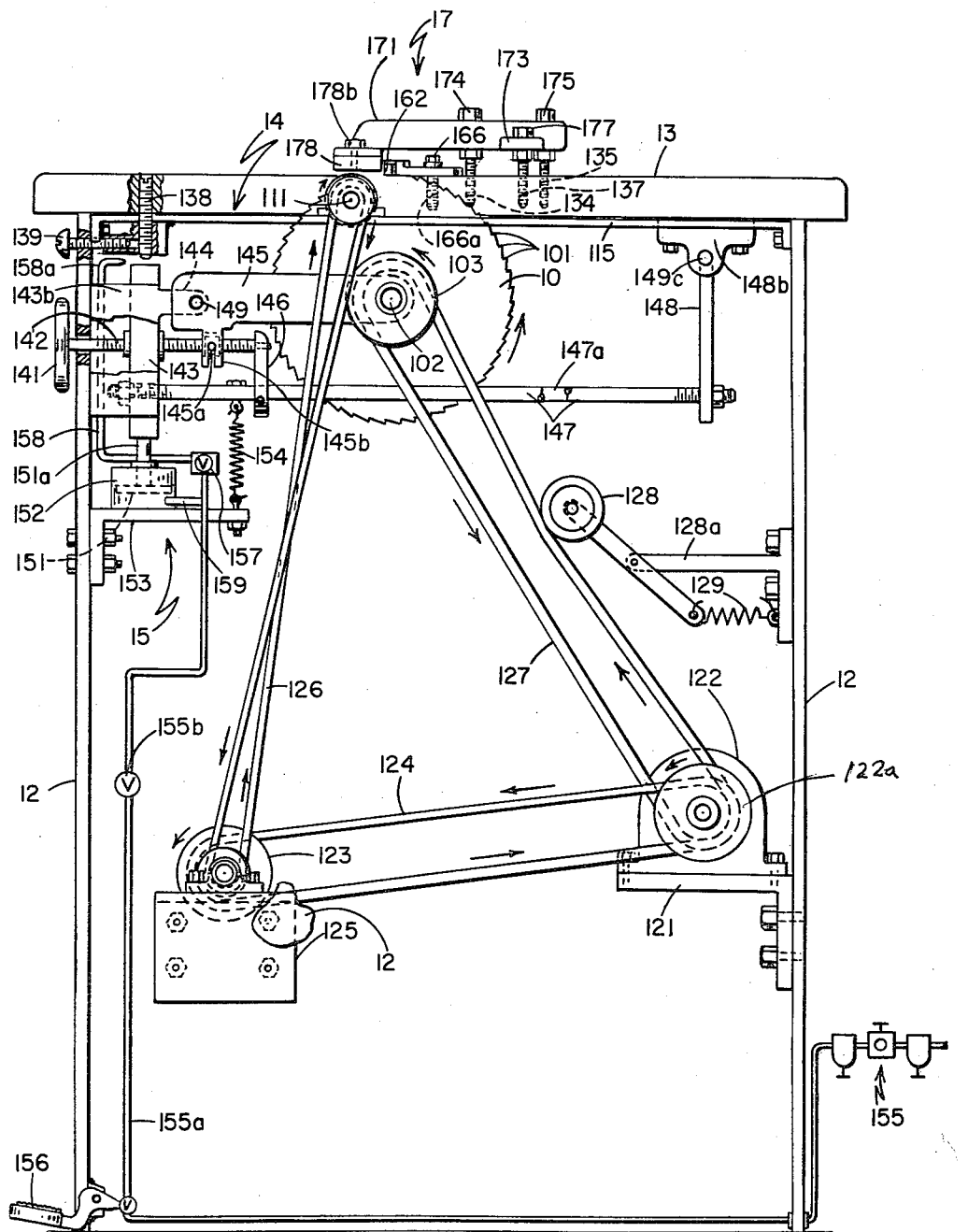
FIGURE 3 is a front elevation with partial cutaway and sectioning to expose the mechanism.
Figure 4:
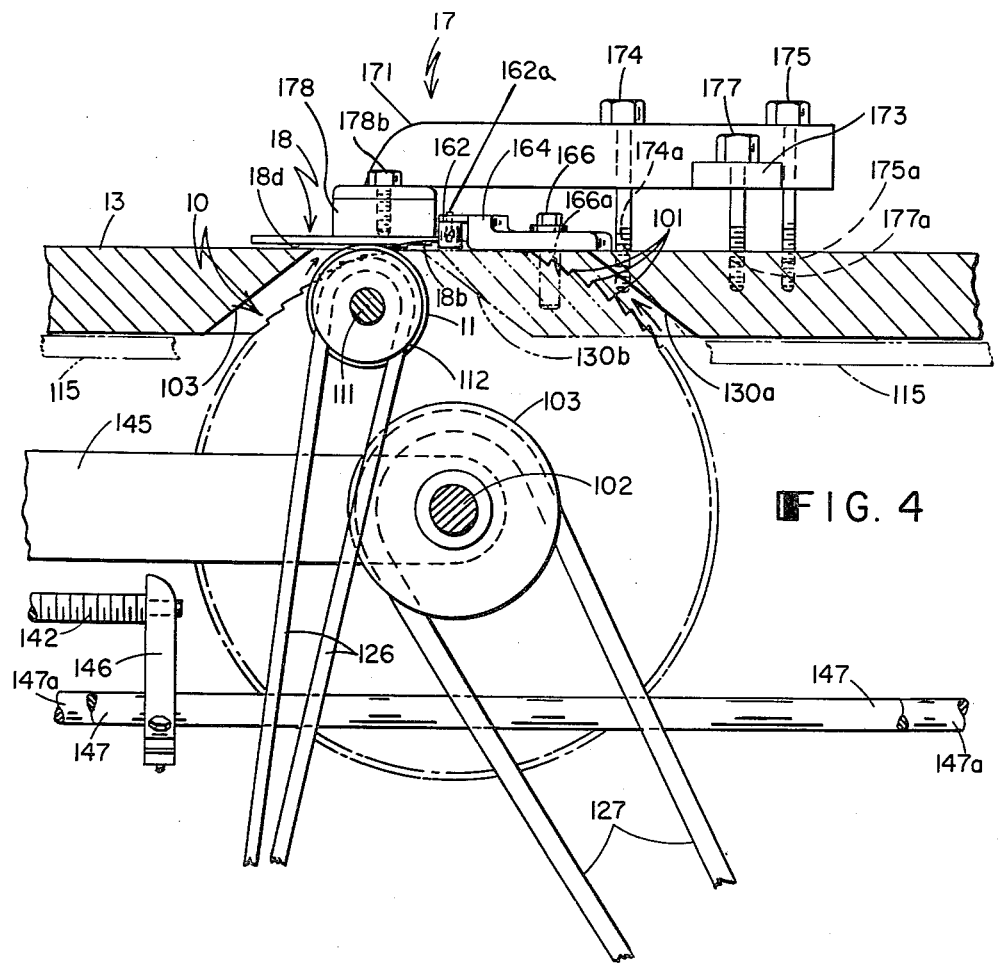
FIG. 4 is an enlarged view of a portion of FIG. 3 with partial cross-section.

In the illustrated example the worm feed and circular saw are fed by V-belts from a single motor. The height of the rotary cutter blade with respect to the working surface has two adjustments. One is a fixed adjustment for the depth of cut in the toe and forepart of the sole, while the second adjustment is controlled by a foot pedal in conjunction with a compressed air system to obtain the shank reduction.

The circular saw 10, as illustrated, has a shaft 102, pulley 103 and teeth 101, and is supported in a vertical position on the support frame 12 by a saw support assembly 14. The top portion of the saw protrudes through an orifice 130a in the horizontal working surface 13 which is also supported by support frame 12. The amount of protrusion, which is of the order of magnitude of the thickness of a sole, is adjustable by the saw support assembly 14 in conjunction with the air lift system 15. The side of the saw 10 opposite that adjacent the pulley 103 is provided with a reinforcing plate 102a mounted on the shaft 102.

Supported by a cross member 115 on the frame 12 is the worm feed 11 which projects very slightly through orifice 130b in the horizontal working surface 13 adjacent to one end of the saw protrusion. The worm feed 11 is mounted on a shaft 111 equipped with a pulley 112 and supported by a pillow block on cross member 115 and has a thrust bearing 113 and an end bearing 114 on support frame 12.

Attached to the lower part of the frame 12 is a motor support bracket 121 on which is fastened motor 122 equipped with a double pulley 122A—122B. From one of the motor pulleys, 122A, a V-belt 124 connects with a separate lower pulley 123 fastened to support 125 which in turn is mounted on the frame 12. The other motor pulley, 122B, is connected by V-belt 127 to the pulley 103 of the saw 10. A V-belt 126 extends between the lower pulley 123 and the pulley 112 of the worm feed 11 and is twisted so that the direction of rotation of the worm feed is clockwise while the direction of rotation of the saw is counterclockwise. A pivotable idler 128 attached by bracket 128a and spring 129 to the frame 12 serves to maintain belt 127 sufficiently tight regardless of the height of the saw.

The left extremity of the protruding portion of the saw is approximately aligned with the left margin of the worm feed 11. Close to the sides of the saw and substantially flush with the surface 13 are rollers 161 and 162 having vertical shafts 161a and 162a, respectively. These rollers 161 and 162 serve as guides for the sole motion, are spaced adjacent the right margin of the worm feed, and are slidably adjustable with their respective frames 163 and 164 having slots 163a and 164a by means of bolts 165 and 166 engaging bolt orifices 165a and 166a in the table 13.

Spaced above the saw and worm feed and adjacent the guide rollers is an assembly 17. This comprises an adjustable depending head 178 which, together wtih the guide rollers, forms a guide pocket. The depending head 178 is supported on a horizontal frame 171 by bolts 178a and 178b. The frame 171 has a bolt 174 engageable through slot 174a with horizontal surface orifice 134, as well as a rear bolt 175 engageable through slot 175a with horizontal surface orifice 135. To increase rigidity, the frame 171 has lateral projections 172 and 173 which in turn have slots 176a and 177a through which are fastened bolts 176 and 177 into horizontal surface orifices 136 and 137. All the table orifices so described are threaded to receive these bolts. By means of these bolts the height of the head 178 above the surface 13 can be adjusted.

The mechanism for adjusting and varying the height of the rotary saw 10 with respect to the table top 13 comprises a saw support assembly 14 and an airlift assembly 15.

The saw support assembly comprises an elongated block 143 (supported by piston rod 151a) which has an upper horizontal extension 144 connected by pivot 149 to saw support member 145 which holds the saw shaft 102. From the lower part of the block 143 extend two horizontal rods 147 and 147a which terminate in a plate 148 supported by a pair of pillow blocks 148A and 148B connected by a pivot rod 149c and mounted on the bottom of the working surface 13. Member 145 has a downward forked extension 145b and rod 147 has an upward mounted member 146. A horizontal threaded shaft 142 passes through the center of block 143, engages extension 145b with a brass fitting 145a to avoid bending and terminates in the top of member 146. A wheel 141 is fixed to the left end of the shaft 142.

Movement of the shaft 142 by means of the wheel 141 causes the saw support member 145 to move hence adjust the initial height of the saw protrusion. This adjustment is made for the selection of the minimum marginal reduction of the sole, i.e., toe and forepart. This adjustment is usually fixed. The instantaneous controllable elevation of the saw to obtain deeper reduction in the shank is accomplished by the air lift system 15 in conjunction with the block 143 as now to be described.

The block 143 is movable in vertical guides 143a and 143b, by being attached to piston rod 151a whose end terminates in ram 151 in air cylinder 152. Depending from the table top in line with the vertical block 143 is an adjustable stop bolt 138. From the side of the frame 12 a lock bolt 139 is provided to lock in the position of the stop bolt 138. This provides an adjustable upper limit for the travel of block 143. Cylinder 152 is supported by a bracket 153 attached to frame 12. Also attached to the bracket 153 is a spring 154 connected to the rod 147.

Operation of the air system tends to push the piston up and upon release of air the spring tends to push the piston down. Air line 155a from regulated air supply 155 is connected through a foot valve 156, to flow control valve 155b, to air cylinder 152 and also through quick-exhaust valve 157 to an air line extension 158 which has an open end 158a near the top of the vertical block 143. Operation of the foot valve causes the piston, hence the vertical block, to go up to bolt 138. Release of the foot valve causes the quick exhaust valve 157 to vent the air through line 158 to the open end 158a thus serving as a means of blowing the grinding dust away from the mechanism. The spring 154 brings the block back. Hence instantaneous control of shank reduction thickness can be done by the operator.

As illustrated in FIGURES 5, 5A and 6 the sole 18 which results has a slightly curved, roughened marginal reduction. The toe and forepart reduction 18a is less than the shank and heel reduction, 18b and c. The original sole thickness is designated as 18d. The illustrated sole was fed first along one edge and then along the other, longitudinally to the worm feed, with the operator controlling the shank reduction by the foot pedal.

It is obvious that various modifications and changes and changes can be made in this invention without departing from the scope thereof as defined in the appended claims.

I claim:

1. A machine for reducing and roughening the margin of a sole comprising a working surface, a rotatable circular cutter having cutting teeth on its edge, protruding through said surface and having an axis of rotation parallel to said surface, means for changing the extent of protrusion of said cutter through said surface, means for feeding a sole in parallel disposition to said surface and edgewise against the protruding portion of said cutter, and sole guiding means adjacent said cutter.

2. The machine of claim 1 wherein the cutter is a circular saw.

3. The machine of claim 1 wherein the feeding means comprises a worm feed protruding through said surface adjacent one side of said cutter protrusion and having an axis of rotation parallel to said surface and wherein means are provided for rotating said saw and worm feed in opposite directions toward one another.

4. The machine of claim 1 wherein said guiding means comprises a guide roller means spaced on said surface adjacent each side of said saw and near said feeding means, and retainer means spaced adjacent said guide roller means and above said cutter protrusion.

5. The machine of claim 1 wherein said guiding means comprises guide roller means adjustably positioned on said surface adjacent each side of said cutter and vertically adjustable retainer means spaced adjacent said guide roller means and above said cutter protrusion.

6. The machine of claim 1 wherein said means for changing the cutter protrusion includes means for sustantially instantaneously increasing the protrusion by selected amount.

7. The machine of claim 1 wherein said means for controlling the cutter protrusion includes fluid operated means for substantially instantaneously increasing the protrusion by a selected amount.

8. The machine for reducing and roughening the margin of a sole comprising a working surface, a circular saw protruding through said surface and having an axis of rotation parallel to said surface, means for changing the extent of protrusion of said saw through said surface, a worm feed protruding through said surface adjacent one side of said saw protrusion and having an axis of rotation parallel to said surface, a guide roller means spaced on said surface adjacent each side of said saw and near said worm protrusion, vertically adjustable retainer means spaced adjacent said guide roller means and above said saw protrusion, and means for rotating said saw and worm feed in opposite directions toward one another.

9. The machine of claim 8 wherein said protrusion changing means includes substantially instantaneous means for increasing said saw protrusion by a selected amount.

10. The machine of claim 8 wherein said protrusion cutter means includes fluid operated means for substantially instantaneously increasing said saw protrusion by a selected amount.

11. A machine for reducing and roughening the margin of a flat work-piece, comprising a working surface, a rotatable circular cutter having cutting teeth on its edge and protruding through said surface, means for feeding such a work-piece in parallel disposition to said surface and edgewise against the protruding portion of said cutter, and work-piece guiding means adjacent said cutter.

References Cited in the file of this patent

UNITED STATES PATENTS

| | | |
|---|---|---|
| 1,741,107 | Griffith | Dec. 24, 1929 |
| 2,287,999 | Kelly | June 20, 1942 |
| 2,577,370 | Small | Dec. 4, 1951 |
| 2,614,411 | Toublanc | Oct. 21, 1952 |